(12) United States Patent
Alshawi et al.

(10) Patent No.: US 7,152,029 B2
(45) Date of Patent: Dec. 19, 2006

(54) SPOKEN LANGUAGE UNDERSTANDING THAT INCORPORATES PRIOR KNOWLEDGE INTO BOOSTING

(75) Inventors: Hiyan Alshawi, Madison, NJ (US); Giuseppe DiFabbrizio, Summit, NJ (US); Narendra K. Gupta, Dayton, NJ (US); Mazin G. Rahim, Matawan, NJ (US); Robert E. Schapire, Maplewood, NJ (US); Yoram Singer, Murray Hill, NJ (US)

(73) Assignee: AT&T Corp., New York, NY (US)

( * ) Notice: Subject to any disclaimer, the term of this patent is extended or adjusted under 35 U.S.C. 154(b) by 778 days.

(21) Appl. No.: 10/160,461

(22) Filed: May 31, 2002

(65) Prior Publication Data

US 2004/0204940 A1 Oct. 14, 2004

Related U.S. Application Data

(60) Provisional application No. 60/374,961, filed on Apr. 23, 2002, provisional application No. 60/306,283, filed on Jul. 18, 2001.

(51) Int. Cl.
*G06F 17/20* (2006.01)
(52) U.S. Cl. .......................................... 704/1
(58) Field of Classification Search ............... None
See application file for complete search history.

(56) References Cited

U.S. PATENT DOCUMENTS 5,970,449 A    10/1999  Alleva et al.
6,246,986 B1    6/2001  Ammicht et al.
6,453,307 B1 *  9/2002  Schapire et al. ............... 706/12
2003/0110147 A1 * 6/2003  Li et al. .......................... 706/1

FOREIGN PATENT DOCUMENTS

EP         726531 A1 *  8/1996

OTHER PUBLICATIONS

Schapire et al. "Improved Boosting Algorithms Using Confidence-rated Predictions", Proceedings of the 11th Annual Conference on Computational Learning Theory, 1998, pp. 80-91, ACM Press.*
Schapire et al. "Incorporating Prior Knowledge into Boosting", Machine Learning: Proceedings of the 19th International Conference, 2002.*
Schapire, R.E., et al., "BoosTexter: A Boosting-based System for Text Categorization", Machine Learning, 39(2/3): 135-168, 2000.

(Continued)

*Primary Examiner*—Tālivaldis Ivars Šmits
*Assistant Examiner*—Eunice Ng
(74) *Attorney, Agent, or Firm*—Henry T. Brendzel

(57) ABSTRACT

A system for understanding entries, such as speech, develops a classifier by employing prior knowledge with which a given corpus of training entries is enlarged threefold. A rule is created for each of the labels employed in the classifyier, and the created rules are applied to the given corpus to create a corpus of attachments by appending a weight of $\eta p(x)$, or $1-\eta p(x)$, to labels of entries that meet, or fail to meet, respectively, conditions of the labels' rules, and to also create a corpus of non-attachments by appending a weight of $1-\eta p(x)$, or $\eta p(x)$, to labels of entries that meet, or fail to meet conditions of the labels' rules.

8 Claims, 2 Drawing Sheets

OTHER PUBLICATIONS

Rochery, M., et al., "Boostexter for Text Categorization in Spoken Language Dialogue", ASRU'2001, Dec. 9-13, 2001, Madonna di Campiglioo, Trento, Italy XP-002215920.

Rochery, M., et al., "Combining Prior Knowledge and Boosting for Call Classification in Spoken Language Dialogue", 2002 IEEE International Conf. on Acoustics, Speech and Signal Processing, vol. 1, May 13-17, 2002. XP002215921.

* cited by examiner

SPOKEN LANGUAGE UNDERSTANDING THAT INCORPORATES PRIOR KNOWLEDGE INTO BOOSTING

RELATED APPLICATIONS

This application claims priority from provisional applications 60/306,283 filed Jul. 18, 2001 and 60/374,961 filed Apr. 23, 2002.

BACKGROUND

This invention relates to classifiers.

Speech and language processing technologies have the potential of automating a variety of customer care services in large industry sectors such as telecommunication, insurance, finance, etc. In an effort to reduce the cost structure of customer care services, many of these industries have depended heavily on complex interactive voice response (IVR) menus for either automating an entire transaction or for routing callers to an appropriate agent or department. Several studies have shown that the "unnatural" and poor user interface of these long touch-tone menus tend to confuse and frustrate callers, preventing them from accessing information and obtaining the desired service they expect. A recent study revealed that over 53% of surveyed consumers say that automated IVR systems are the most frustrating part of a customer service. In this survey, 46% of consumers dropped their credit card provider because of the perceived poor customer care.

Advances in speech and language technologies have the potential for improving customer care not only by cutting the huge cost of running call centers but also by providing a more natural communication mode for interacting with users, without requiring them to navigate through a laborious touch-tone menu. This has the effect of improving customer satisfaction and increasing customer retention rate. These values, which collectively form the foundation for an excellent customer care experience, have been evident in the AT&T Call Routing "How May I Help You" service, which is currently deployed nationally for consumer services, as reported by A. L. Gorin et al in "How May I help You," *Speech Communication*, pp. 113–127, 1997.

It is expected that over the next few years, speech and language technologies will play a more vital role in not only customer care services but also in general "Help Desk" applications where the objective is not only routing of calls or accessing information but also in solving technical problems, answering sales inquiries, supplying requested recommendations, and trouble shooting. Many computing and telecommunication companies today provide some form of a Help Desk service through either the World Wide Web or using a human agent.

Several technology requirements exist for voice-enabling Help Desk applications, including having a speech recognizer that is capable of recognizing a large-vocabulary spontaneous speech and supporting barge-in, a spoken language understanding (SLU) unit that parses the natural language input into relevant information, a dialog manager that operates in a mixed-initiative mode, and a text-to-speech synthesizer that is able to generate high-quality synthesized voice statements to the user.

A large number of speech recognizers are known in the art including, for example, U.S. Pat. No. 6,246,986, issued to Ammicht et al on Jun. 12, 2001 and assigned to the assignee of this invention. The objective of the speech recognizer is to convert the speech utterances to text, to be employed in the SLU unit that follows.

As for the spoken-language-understanding (SLU) module, a need exists for an application-specific corpus of speech data that may be used for designing a classifier for that application, a set of classes for that application, and an annotation relative to the classes of the speech data in the corpus.

The speech data comprises a collection of entries, each entry being an utterance (also converted to text) of a word, a phrase, a sentence, or a number of sentences, where such utterances have been collected from users, or may be expected from the user of the designed application. The designers of the application determine the set of classes. The annotation of an entry is a set of one or more labels that attach to the entry, meaning that the entry is related to the attached labels. In a telecommunications application, for example, if the corpus of training utterances contains the entry "I wish to speak with someone regarding my July Statement" and if the label "billing" is included in the set of classes, then the "billing" label ought to be attached to this entry.

The process of creating annotations for the entries of the corpus of training data conventionally relies on information that comes with the corpus of speech data, or from people who are familiar with the application that is being designed. Collecting, transcribing and labeling speech data is a resource-intensive, and time consuming, process. This process does not form a part of this invention.

As indicated above, many situations exist in today's commercial environment where a natural language interaction with a customer would be very useful. The need exists to create a system that is able to naturally and effectively interact with customers; and especially, there are great commercial incentives for creating such systems quickly, dispensing with drawn out design processes that are carefully tailored to the applications. Additionally, there is a need to create such systems without the benefit of a large corpus of training utterances. Specifically, there is a need to create such systems without the benefit of a large corpus of speech data, which takes a long time to create and which is seldom available in the beginning of the development cycle.

SUMMARY

When designing a classifier for a particular application, where the classifier attaches labels to an entry to be classified, an advance in the art is achieved, and an improved classifier is realized, with a process that incorporates prior knowledge about the particular application. Specifically, the improved classifier is realized with a boosting algorithm that employs a base corpus of training entries that is derived from a given corpus of training sequences, with the assistance of a rule, relative to each of the classifier labels, that is based on prior knowledge about the particular application. Illustratively, a given corpus of training data includes a set of training entries, and each training entry has an associated field of up to k attached labels. A preselected, uniform, weight is initially associated with each label of each entry. The rule that is created through prior knowledge about the particular application, relative to each label, specifies a condition that, if an entry x that is to be classified satisfies the condition, leads to the conclusion that the associated label should be attached to entry x, with a predetermined weight $p(x)$.

A first a set of created entries for increasing the corpus of training entries is created by attaching all labels to each entry of the given corpus of training entries, with a weight p(x), or 1−p(x), in association with each label that meets, or fails to meet, the condition specified for the label. A second set of created entries for increasing the corpus of training entries is created by asserting a non-attachment of labels to each of the original corpus of training entries, with a weight of 1−p(x), or p(x), in association with each label that meets, or fails to meet, the condition specified for the label. If it is desired to recognize that there is a certain level of confidence in the constructed rule then the weights that may be attached can be made to reflect this confidence by including a factor η, and to therefore employ ηp(x,l) and 1−ηp(x,l).

A system for understanding spoken language is realized by forming a system that normalizes entered utterances to be classified, passes the normalized utterances through a mostly deterministic entity extraction module, and applies the output entity-extracted utterances to a classifier constructed with a boosting algorithm that is based on the three-fold corpus of training entries, as described above.

DETAILED DESCRIPTION

Figure 1:
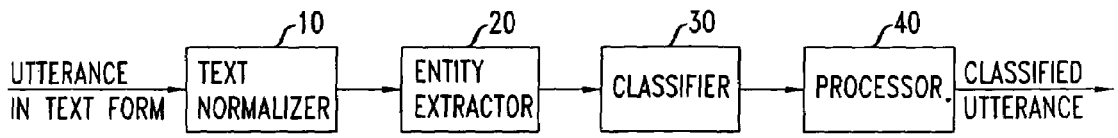
FIG. 1 presents a block diagram of a spoken language understanding unit.

FIG. 1 presents a block diagram of an SLU unit intended to understand spoken speech, in real time, for any application of choice; for example, telecommunication service, airline reservations service, catalog purchases, insurance company customer service, etc. Such applications can, effectively, conduct "interactive conversations" between a human caller and a system that includes the FIG. 1 SLU. Although it is not necessary for purposes of this invention, the FIG. 1 arrangement presumes that the speech has been converted to text before it is applied to the arrangement. Such conversions are well known in the art. Thus, the FIG. 1 arrangement comprises a text normalization module 10 that is responsive to an applied input utterance (converted to text), an entity extraction module 20 responsive to module 10, and a classifier 30 responsive to module 20 for parsing out named entities. Post-classification processor 40 handles the applied input utterance that is augmented by the information developed in classifier 30.

Text normalization module 10 eliminates some "noise" variations among words and utterances. The effective reduction in the variability of the input effectively increases the size of the training-set and thus improves the SLU accuracy. The text normalization module uses morphology, synonyms, and removal of disfluencies ("filler" utterances, such as "ah"). A text normalization system can be employed in accordance with the teachings of Alleva et al, in U.S. Pat. No. 5,970,449, issued Oct. 19, 1999, and titled "Text Normalization Using a Context-Free Grammar." A significant amount of information is also available from SIL International, in www.sil.org.

Entity extraction module 20 simplifies the tasks presented to SLU module 30 by parsing out task-independent entities in the input utterances, such as phone numbers, dates, etc. and effectively replacing the identified entities with a metaterm. For example, the phrase "I want to speak to someone about the January 02 bill for 973 345 5555" is replaced by module 20 with "I want to speak to someone about the <date>January 02 <date>bill for <phone_number>973 345 5555 <phone_number>." This relieves the burden on classifier 30 because a portion of the utterance has been understood and, therefore, need not be considered by the classifier. For example, the information between delimiters <phone_number>, i.e., 973 345 555, need not be considered by classifier 30. The characteristic feature of the process carried out in module 20 is that it is mostly a deterministic pattern matching. That is, in connection with many of the objects that are to be extracted, for example, money, and phone number, a deterministic approach can be taken where, basically, a collection of patterns can be specified against which the input data can be applied. In connection with some other objects, however, it may be decided that a classifier, perhaps unlike the process carried out in classifier 30, which is disclosed below, should be used instead of, or in addition to the deterministic approach.

Classifier 30 is a module that attaches a classification, or a label, to an applied input. In its simplest form, a classifier may perform a test on the input, and in response thereto output a +1, or a −1 signal. A +1 means that the classifier concluded that a predetermined label should be attached to the input, and a −1 means the contrary. A more sophisticated classifier reaches a plurality of decisions, relative to a corresponding plurality of labels. A still more sophisticated classifier not only reaches a plurality of decisions, but also provides a confidence measure about those decisions.

To illustrate the latter, if the set of preselected labels consists of (1) "operator assistance"
(2) "billing question"
(3) "failure to connect problem"
(4) "request for maintenance" and
(5) "new business,"

the classifier might associate with utterance x the vector (9, 0.1,−1.6, −1.3, −5), meaning that the classifier attaches a confidence measure of:

9 to the conclusion that the "operator assistance" label should be attached, 0.1 to the conclusion that the "billing question" label should be attached, 1.6 to the conclusion that the "failure to connect problem" label should NOT be attached, 1.3 to the conclusion that the "request for maintenance" label should NOT be attached, and 5 to the conclusion that the "new business request for maintenance" label should NOT be attached.

Alternatively, the classifier might associate with the utterance the vectors (1, 1, −1, −1, −1) and (9, 0.1, 1.6, 1.3, 5), imparting the same meanings. The first vector indicates whether a label is, or is not attached, and the second vector provides the confidence measure.

A unique boosting algorithm is disclosed is U.S. Pat. No. 6,453,307 issued Sep. 17. 2002. While this algorithm is disclosed in detail in the aforementioned application, for ease of understanding of the instant invention, it is described herein as well. The teachings of this application are hereby incorporated by reference.

Consideration of the algorithm begins with a corpus of training utterances with associated label sets. In the context of spoken language, for example, a training sample may be an utterance that, through conventional means (described above), was converted to a text word sequence. Thus, for example, an utterance in the corpus of training utterances might be "I wish to speak with someone regarding my bill"

and in an arrangement where the set of labels under consideration consists of above-used five categories, or labels, the label vector annotating this entry in the database might be (1, 1, −1, −1, −1), indicating the affirmative association of the utterance with labels "operator" and "billing," and no association with the other labels. Conventionally, a large corpus of training utterances is used to design a classifier, with the hope that the designed classifier will be effective to correctly predict labels for utterances that are not in the training corpus.

A simple classifier effectively answers a test posed in the form

"does the input utterance contain the <term>?"

The term, in the context of the test carried out by a classifier, is a word (e.g., "bill"), a number of consecutive words (e.g., "can I have"), a plurality of selected words within a given proximity of each other (e.g., "telephone" within 3 words of "working"), or some logical combination of words. Most simply, the set of terms from which a classifier chooses a term is derived from the corpus of training utterances. For example, the set of terms may consist of a unique appearance of all words found in the corpus of training utterances, or all words minus preselected "noise" words. Of course, this list can be augmented by the party creating the classifier for a particular application.

The result of a classifier's test is either a "yes" or a "no," but the output signal of the classifier, relative to a particular label, can be chosen by the classifier's designer. Illustratively it can be a a) 1, or a −1, meaning that the label should be attached to the utterance under test, or not attached to the utterance;
b) 1, 0 or −1, meaning that the classifier believes that the relevant label is definitely attached to the utterance, no decision, or definitely not attached to the utterance;
c) any real number, where the sign indicates whether the classifier believes that the label is, or is not, attached to the utterance, and the magnitude indicates the level of confidence that the classifier has about its decision; or
d) same as c), but limited to numbers that are not larger (in magnitude) than a preselected value.

When designing a classifier, the aim is to find a term that provides the most accurate classification in the training corpus, with the above-mentioned hope being that such a classifier will also provide the most accurate classification for utterances other that in the corpus of training utterances. It is disclosed in the aforementioned application that a classifier can be constructed from a plurality of component classifiers.

To create a component classifier, an exhaustive search of the training corpus can be made to establish a score for each of a plurality of candidate classifiers, each of which uses a different term. The classifier that provides the best score is selected as the component classifier of choice. Naturally, it is expected that while one corpus of training utterances will result in a component classifier that employs one term, another corpus of training utterances will result in a component classifier that employs another term. Consequently, it has been determined that is advantageous to have numerous component classifiers, with each derived from a different training corpus. Further, it has been realized that when one has a single corpus of training utterances, one can create the effect of having different corpus of training utterances by simply taking different subsets of the single corpus. Further still, it has been realized that the notion of taking a subset is akin to associating a weight with each utterance, and creating different subsets by merely setting a weight of 1 to different subsets of the utterances in the corpus (and a weight of 0 for the other utterances). Further yet, it has been disclosed in the aforementioned application that subsets may be created with weights that are real numbers, and not just 1 and 0.

In accord with the disclosure of the aforementioned application, a plurality of component classifiers, $h_t$, is created in an iterative manner that outputs a decision relative to a plurality of k labels, and each classifier is created with the aid of the same training corpus of utterances, except that each label of each entry in the corpus has an associated weight, $w_t(i, l)$ that changes from one iteration to the next. For example, $w_3$ (431,2) refers to the weight of the second label of the $431^{st}$ entry in the corpus of training utterances, in the third iteration of the component classifiers design.

Figure 2:
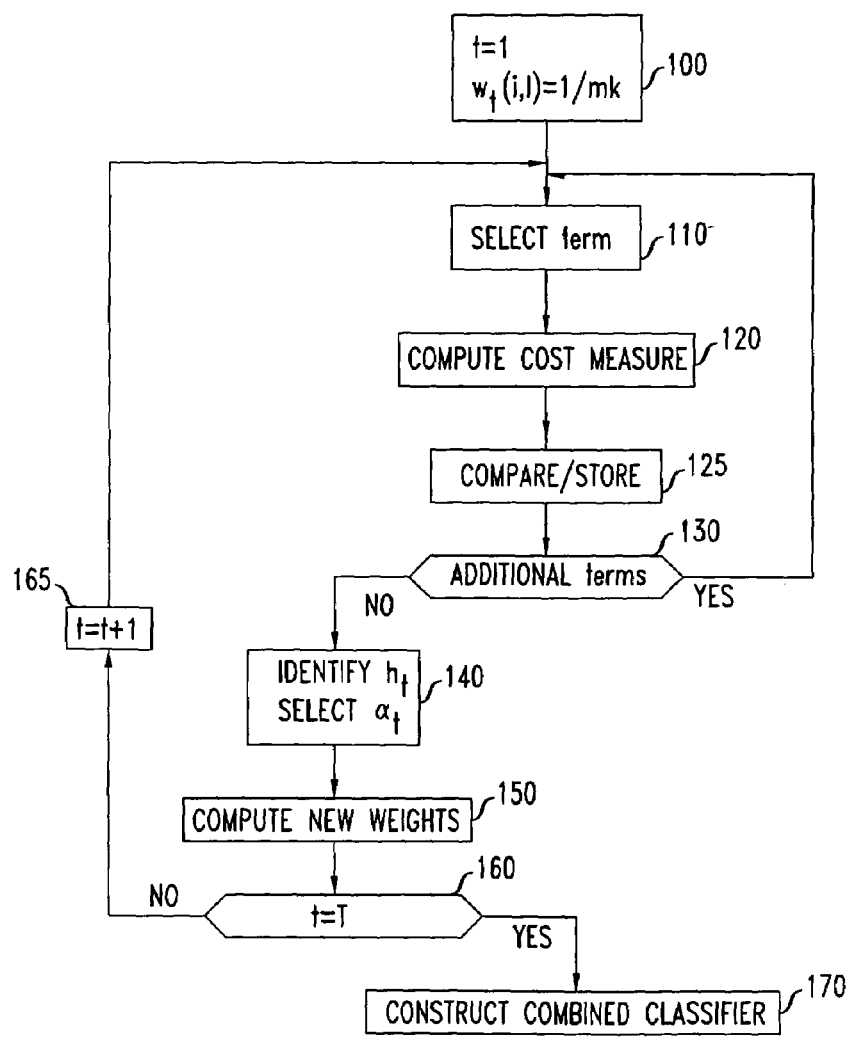
FIG. 2 is a flow chart of a boosting algorithm for developing a classifier.

Given the corpus of training utterances, $(x_1, Y_1)$, $(x_2, Y_2), \ldots (x_m, Y_m)$, where $x_i$ is the $i^{th}$ utterance and $Y_i$ is the associated label vector, the procedure for developing a classifier, shown in FIG. 2, is as follows.

At step 100 an iteration variable t is set to 1, denoting that it is the first iteration, and a weight variable $w_t(i,1)$ is also set to 1, in connection with each label of each entry in the corpus of training utterances. (If one wishes to operate in an equalized manner, the weight would be set to equal 1/mk, where m is the number of utterances in the corpus, and k is the number of labels under consideration, e.g., 5, in the examples above.) Control then passes to step 110 where a term is selected (e.g., from a set of unique terms that is based on the corpus of training utterances) for a candidate classifier. Control then passes to step 120 where the corpus of training utterances is passed through the candidate classifier, developing the cost measure $$Z_t = \sum_i w_t(i, 1)e^{-\alpha_t Y_i(1)h'_t(x_i,1)} + \sum_i w_t(i, 2)e^{-\alpha_t Y_i(2)h'_t(x_i,2)} \ldots \quad (1)$$

$$\sum_i w_t(i, k)e^{-\alpha_t Y_i(k)h'_t(x_i,k)}$$

$$= \sum_i \sum_l w_t(i, l)e^{-\alpha_t Y_i(l)h'_t(x_i,l)},$$

where $h_t(x_i,l)$ is the output of the candidate classifier, relative to label l for entry $x_i$, of the applied corpus of training utterances, and $Y_i(l)$ is the l label value associated with entry $x_i$, it being either +1 or −1 and $\alpha_t$, is a chosen parameter which, as taught in the aforementioned 6,543,307 patent is typically positive. It is noted that the cost measure encompasses all labels as well as all entries of the corpus of training utterances.

Once a cost measure is determined, control passes to step 125 where the developed measure is compared to a previously stored "low water mark" cost measure. If the currently developed cost measure is lower than the stored "low water mark cost measure, it becomes the "low water mark" cost measure, and the candidate classifier's term that produced this cost measure is stored together with the new "low water mark" cost measure. Control then passes to step 130, which determines whether there are any other terms to be considered in the current iteration. If there are such terms, control returns to step 110, where another term is selected. Otherwise, the process continues to step 140, which concludes that the term stored by step 125 is the appropriate classification term for classifier $h_t$, and chooses a real number $\alpha_t$, for example, $\alpha_t=1$, to be associated with classifier $h_t$.

From step 140, control passes to step 150 to compute new weights $$w_{t+1}(i,l) = \frac{1}{Z_t}(w_t(i,l)e^{-\alpha_t Y_i(l)h_t(x_i,l)}), \quad (2)$$

where $h_t(x_i, l)$ is the output of classifier $h_t$, relative to label l, for entry $x_i$ of the applied corpus of training utterances. Control then passes to step 160, which determines whether t is equal to threshold T. If not, control passes to step 165, which increments t by 1 and returns to step 110. When t=T, control passes to step 170, where the final, combined, classifier output, f(x,l), is ascertained to be:

$$f(x,l) = \sum_{t=1}^{T} a_t h_t(x,l), \quad (3)$$

where x is the utterance to be classified. This classifier output can also be expressed through a probability function of the form $$\frac{1}{1+e^{f(x)}}. \quad (4)$$

A classifier that develops a classification signal in accordance with the principles disclosed above is termed herein as a "boosting classifier."

The output developed by classifier $h_t$ can be set to $$h_t(x_i, l) = \begin{cases} c_{0l} & \text{if term} \notin x_i \\ c_{1l} & \text{if term} \in x_i \end{cases} \quad (5)$$

where $c_{0l}$ is the output of classifier $h_t$ when term is not found in tested entry $x_i$, and $c_{1l}$ is the output of classifier $h_t$ when term is found in tested entry $x_i$. Illustratively, $$c_{0l} = \frac{1}{2}\ln\left(\frac{W_+^{0l}+\varepsilon}{W_-^{0l}+\varepsilon}\right) \text{ and } c_{1l} = \frac{1}{2}\ln\left(\frac{W_+^{1l}+\varepsilon}{W_-^{1l}+\varepsilon}\right) \quad (6)$$

where $\varepsilon$ is a preselected small number (insuring that $c_{0l}$ and $c_{1l}$ are not excessively large in magnitude). Illustratively, $\varepsilon=1/(\text{\# of entries in corpus times \# of labels})$. With this formulation for $c_{0l}$ ($c_{1l}$) it turns out that the sign of $c_{0l}$ ($c_{1l}$) indicates whether the classifier attaches (does not attach) label l to entry $x_i$, and the magnitude of $c_{0l}$ ($c_{1l}$) indicates the measure of confidence that the classifier has in its decision.

Other formulations for the developed output are also possible, such as $$c_{jl}=sgn(W_+^{jl}-W_-^{jl}), \quad (7)$$

where j is either 0 or 1.

The factor $W_+^{1l}$ is the sum of all weights w(i,l), associated with label l, taken over all entries of the corpus of training utterances, where the classifier's test yielded a "yes" answer, and where the value of the label l in the database is a "+1". (The subscript t is not included in w(i,l) of the above sentence because the meaning of $W_+^{1l}$ is the same for all iterations.) Correspondingly, the factor $W_-^{1l}$ is the sum of all weights associated with label l, taken over all entries of the corpus of training utterances where the classifier's test yielded a "yes" answer, and where the value of the label l in the database was a "−1". Similarly, the factor $W_+^{0l}$ is the sum of all weights associated with label l, taken over all entries of the corpus of training utterances where the classifier's test yielded a "no" answer, and where the value of the label l in the database was a "+1". The factor $W_-^{0l}$ is the sum of all weights associated with label l, taken over all entries of the corpus of training utterances where the classifier's test yielded a "no" answer, and where the value of the label l in the database was a "−1". Expressed mathematically, $$W_{sgn(b)}^{jl} = \sum_{i=1}^{m} w_t(i,l)\langle x_t \in X_j \wedge Y_t(l) = b\rangle \quad (8)$$

where j is either a 1 or a 0, $X_1$ is the set of documents that contain the term used by the classifier $X_0$ is the remaining set of documents, and b is either a +1 or a −1, and $\langle\xi\rangle$ is 1 when $\xi$ is true, and 0 otherwise.

Another weight-determining approach can also be used in place of the one used in equation (2) above, for example, $$w_{t+1}(i,l) = \frac{1}{1+\exp\left(Y_i(l)\sum_{q=1}^{t} h_q(x_i,l)\right)}. \quad (9)$$

The above-described method is entirely data driven, in the sense that the classifier that is generated is derived exclusively from the corpus of training utterances. When that corpus is large, this approach makes sense. However, in some applications the available data may be rather sparse. Fortunately, apriori knowledge, for example knowledge known to the human designers of the particular application, may be available that might compensate for this lack of data.

To illustrate, assume a corpus of training utterances that has 6 entries as shown in the first column of table 1 below, and that for the 5 classification labels illustratively chosen above, the labels that are associated with the entries are shown in the second column of table 1, in the order (1) "operator assistance," (2) "billing question," (3) "failure to connect problem," (4) "request for maintenance" and (5) "new business." Assume further that the term selected for the candidate classifier is the word 'speak," meaning that the candidate classifier effectively asks the question "Is the term 'speak' found in the utterance?" When a term in the corpus is applied to the candidate classifier, the candidate either reaches the decision "yes" (+1) or the decision "no" (−1). For sake of simplification, Table 1 shows those decisions only for label (2).

TABLE 1

| utterance | 1 | 2 | 3 | 4 | 5 | |
|---|---|---|---|---|---|---|
| I . . . speak . . . agent . . . | +1 | +1 | +1 | −1 | −1 | −1 |
| Good . . . speak . . . human . . . | +1 | +1 | +1 | −1 | −1 | −1 |
| My . . . business office . . . person . . . | +1 | +1 | −1 | −1 | −1 | +1 |
| . . . line . . . working . . . | −1 | −1 | −1 | +1 | −1 | +1 |
| Why can't I . . . dial . . . tone . . . | −1 | +1 | −1 | +1 | +1 | −1 |
| Phone . . . extra . . . cost . . . | −1 | −1 | −1 | −1 | −1 | +1 |

To compute the values of $c_{0l}$ and $c_{1l}$ (l=2), for example, according to equation (6), the groupings of $W_+^{1l}$, $W_-^{1l}$, $W_+^{0l}$, and $W_-^{0l}$, need to be ascertained, and a value for $\epsilon$ needs to be chosen. Thus, ascertaining that $W_+^{1l}=2$(rows 1 and 2), $W_-^{1l}=0$, $W_+^{0l}=2$(rows 3 and 5), and $W^{0l}=2$ (rows 4 and 6), and choosing $\epsilon=0.02$ yields, for label (2), $$c_0 = \frac{1}{2}\ln\left(\frac{2.02}{2.02}\right) = 0, \text{ and } c_1 = \frac{1}{2}\ln\left(\frac{2.02}{0.02}\right) = 2.308.$$

What these values say is that, based on the available corpus, a classifier can be employed, which states:

| | |
|---|---|
| IF | the utterance contains the term 'speak' |
| THEN | attach label (2) with a confidence measure of 2.308 |
| ELSE | do not attach label (2) with a confidence measure of 0. |

Extending this to all labels, the classifier states:

| | |
|---|---|
| IF | the utterance contains the term 'speak' |
| THEN | predict label (1) with a confidence measure of $p_1$, predict label (2) with a confidence measure of $p_2$, predict label (3) with a confidence measure of $p_3$, predict label (4) with a confidence measure of $p_4$, and predict label (5) with a confidence measure of $p_5$, |
| ELSE | predict label (1) with a confidence measure of $p_6$, predict label (2) with a confidence measure of $p_7$, predict label (3) with a confidence measure of $p_8$, predict label (4) with a confidence measure of $p_9$, and predict label (5) with a confidence measure of $p_{10}$. |

The values p1 through p10 are determined values of p(x) that, for sake of not getting mired in calculations that add nothing to understanding, are left unspecified.

It may be noted that predicting with a negative confidence measure of a large magnitude is tantamount to predicting the negative of an affirmative association. The term "attaches" sometimes is used to represent an affirmative association, and the term "does not attach" sometimes is used to represent a negative of an affirmative association.

Proceeding with the example, the cost measure contribution from label (2) can be computed, as shown in table 2

TABLE 2

| utterance | label | decision | cost |
|---|---|---|---|
| I . . . speak . . . agent . . . | +1 | +1 | $e^{-(+1)c1} = .0995$ |
| Good . . . speak . . . human . . . | +1 | +1 | $e^{-(+1)c1} = .0995$ |
| My . . . business office . . . person . . . | +1 | −1 | $e^{-(+1)c0} = 1$ |
| . . . line . . . working . . . | −1 | −1 | $e^{-(-1)c0} = 1$ |
| Why can't I . . . dial . . . tone . . . | +1 | −1 | $e^{-(+1)c0} = 1$ |

TABLE 2-continued

| utterance | label | decision | cost |
|---|---|---|---|
| Phone . . . extra . . . cost . . . | −1 | −1 | $e^{-(-1)c0} = 1$ |
| Total cost for | | | 4.199 |

Figure 3:
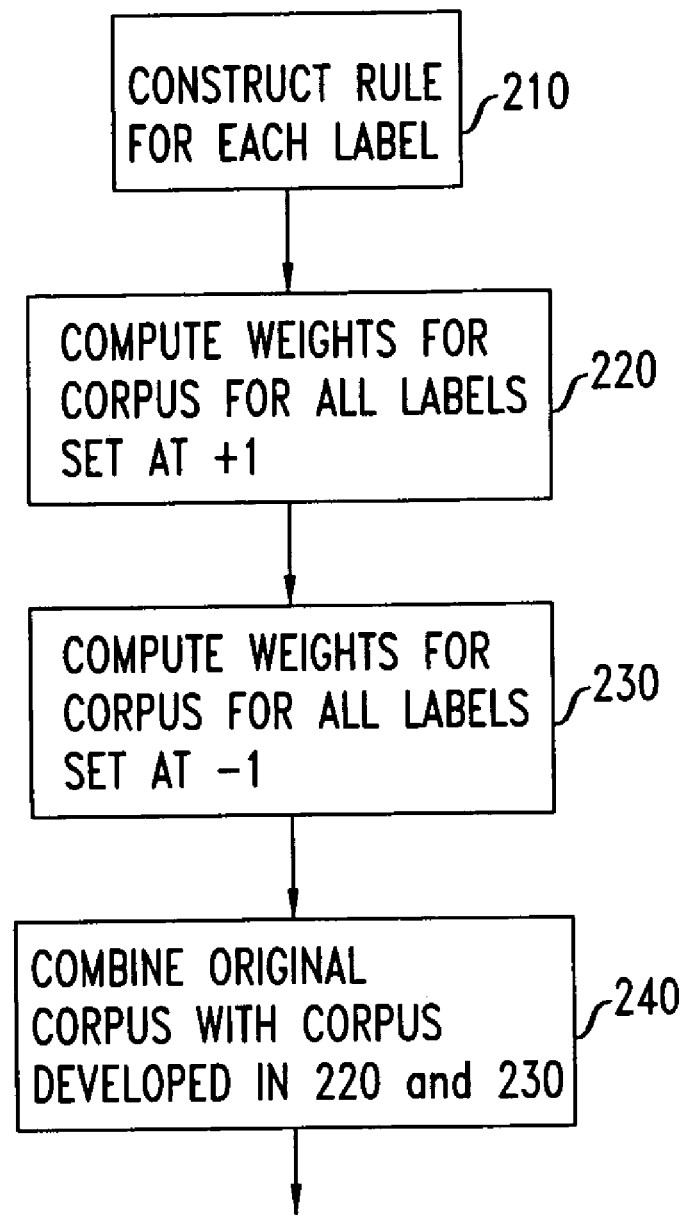
FIG. 3 is a flow chart for creating a threefold version of a given corpus of training entries.

The incorporation of apriori knowledge to enlarge the originally provided corpus of training entries is effected as shown in FIG. 3.

In step 210, for each label, l, l=1,2, . . . k, a rule is constructed for attaching the label to an entry, x, with a confidence measure p(x,l), meaning that each of the rules specifies a term for testing whether the associated label either attaches, or does not attach, to the entry, as well as a confidence measure p(x,l) relating to a decision to attach the label l. Implicitly, the rule also specifies a confidence measure of 1−p(x,l) relating to a decision not to attach the label l. This rule is constructed from apriori knowledge of the application for which the classifier is being designed. In step 220, a first additional corpus of training utterances is created from a originally provided corpus of m training utterances with k associated labels and initial weights set to 1 (i.e., $w_0(i,l)=1$), and then from the constructed rules for the l labels the weights are adjusted to reflect the knowledge reflected in the rules (giving a probability measure) and confidence in the rule (an η factor). This first additional corpus of training utterances includes the set $\{x_i,+1\}$, where $x_i$, is the $i^{th}$ utterance in the originally provided corpus of training utterances and the +1 is an associated vector of k elements each of which has the value +1 (for example, when k=5, the +1 vector corresponds to (1, 1, 1, 1, 1), and each member of the set includes an associated weights vector with elements $w_0(i,l) = \eta p(x_i,l)$, indexed by m=i and thus appended to the m entries of the given corpus. The constant η is a positive number; for example when the confidence is high, η might be set to 3. When the confidence is low, η might be set to 0.02. A simplified version may, of course, apply no confidence factor at all, in which case it can be thought that the factor η=1 is applied.

Step 230 creates a second additional corpus of training utterances from the originally provided corpus of m training utterances, and from the constructed rules for the l labels in a manner that is identical to than of step 220. The only difference is that the second additional corpus of training utterances includes the set $\{x_i,-1\}$, and the associated weights vectors carry the weights $w_0(i,l) = \eta(1-p(x_i,l))$.

Indexing this second additional corpus of training utterance by 2m+i, permits step 240 to easily combine the originally provided corpus with the first additional corpus and the second additional corpus to create a combined corpus of training utterances that is used by the classifier.

These weights are used in each of the subsequent iterations, t=0,1, . . . T, for example, according to $$w_{t+1}(i, l) = \frac{w_0(i, l)}{1 + \exp\left(Y_i(l) \sum_{q=0}^{t} h_q(x_i, l)\right)}. \quad (10)$$

Effectively, an additional, 0th iteration, classifier is added with the combined classifier; that is, $$h_0 = \ln\left(\frac{p(x)}{1-p(x)}\right), \quad (11)$$

and $$f(x) = \sum_{t=0}^{T} h_t(x). \quad (12)$$

In summary, the given corpus of m entries has a vector associated with each entry, which vector describes attachment or non-attachment of a plurality of labels by to the statement, indicated with +1 and −1 values, respectively, for example, in the form depicted below for the first entry and the $m^{th}$ entry:

| statements | index | label$_1$ | label$_2$ | label$_3$ | label$_4$ | label$_5$ | label$_k$ |
|---|---|---|---|---|---|---|---|
| statement 1 | 1 | +1 | +1 | −1 | +1 | −1 | −1 |
| weight | | 1/mk | 1/mk | 1/mk | 1/mk | 1/mk | 1/mk |
| . | | | | | ... | | |
| statement m | m | +1 | −1 | −1 | −1 | −1 | +1 |
| | | 1/mk | 1/mk | 1/mk | 1/mk | 1/mk | 1/mk |

The first added collection of entries, in accord with the disclosure above, illustratively has the form:

| statements | index | label$_1$ | label$_2$ | label$_3$ | label$_4$ | label$_5$ | label$_k$ |
|---|---|---|---|---|---|---|---|
| statement 1 | m + 1 | +1 | +1 | +1 | +1 | +1 | +1 |
| weight | | $p_1$ | $2p_2$ | $0.4p_3$ | $1 - p_4$ | $1.5p_5$ | $p_6$ |
| . | | | | | ... | | |
| statement m | 2m | +1 | +1 | +1 | +1 | +1 | +1 |
| | | $1 - p_7$ | $1 - 2p_8$ | $0.4p_9$ | $1 - p_{10}$ | $1.5p_{11}$ | $p_{12}$ |

Note that all the statements assume an attachment; i.e., all entries in the first row of each statement have a +1 value. Note also that a confidence level multiplication factor, η, (i.e., 1, 2, 0.4, and 1.5) is reflected in the entries of the table. The second added collection of entries, in accord with the disclosure above illustratively, has the form:

| statements | index | label$_1$ | label$_2$ | label$_3$ | label$_4$ | label$_5$ | label$_k$ |
|---|---|---|---|---|---|---|---|
| statement 1 | 2m + 1 | −1 | −1 | −1 | −1 | −1 | −1 |
| weight | | $1 - p_1$ | $1 - p_2$ | $1 - 0.4p_3$ | $p_4$ | $1 - 1.5p_5$ | $1 - p_6$ |
| . | | | | | ... | | |
| statement m | 3m | −1 | −1 | −1 | −1 | −1 | −1 |
| | | $p_7$ | $2p_8$ | $1 - 0.4p_9$ | $p_{10}$ | $1 - 1.5p_{11}$ | $1 - p_{12}$ |

Note that all the statements assume a non-attachment; i.e., all entries in the first row of each entry have a −1 value. Note also that when a probability measure of $p_1$ is associated with statement 1, label 1 in the first-added collection, and the probability measure of $1-p_1$ is associated with statement 1, label 1 in the second-added collection of entries; and the same is true for the other cells in the above tables.

Prior knowledge may be acquired from several sources, for example, human judgment, application guidelines and manuals, world knowledge, experts' advice, and in-domain websites. Typically, when developing a spoken language dialog system, designers do have access to such knowledge. In accordance with the principles disclosed herein, designers of a particular application can exercise their inherent capabilities to reduce the information available to them about the particular application to a rule, and to thereby bootstrap the application with a good set of component classifiers even in the presence of only a small corpus of training utterances.

For example, prior knowledge permits designers of a spoken language understanding unit in the airlines reservations field to an encode a rule that would correctly classify utterances that include "yes," "ok," "correct," "yea," "yep," "all right," or "fine," etc. as confirmatory responses; for example, to the question "So you want to fly from Boston to New York on Sunday evening?" The constructed rule for label "confirmation" might be yes|ok|yea|yep|all right|fine    0.9 where "|" indicates the logical OR. Another rule, for label "agent" might be (talk|speak)&(human|operator|service & agent)    0.95 where the "&" indicates the logical AND.

In general, the logical operators OR, AND, and NOT need to be supported when incorporating prior knowledge. That is, what is required is a method that permits employment of these operators into the $0^{th}$ iteration, i.e., in classifier $h_0$.

The above disclosed the principles by which superior classification of applied data can be achieved. It should be realized that various modifications could be incorporated in the disclosed principles without departing from the spirit and scope thereof. For example, while the disclosure above concentrates on speech utterances, the same principles apply to applications where text is to be classified. Applications for text classification abound, for example, screening of email, cataloging articles, classifying web pages, etc.

The invention claimed is:

1. A method for generating an enlarged corpus of training entries for a particular application, given a set of k labels and an initial corpus of training m entries, where each of said entries includes at least a data portion, comprising the steps of:

for each label l of said k labels, creating an associated rule that specifies one or more conditions that said data portion of an applied entry x must meet in order for said rule to reach a conclusion that said label l forms an attachment to said entry x, and with a weight ηp(x,l), where η is a positive number representing a measure of confidence in said rule, and p(x,l) is a probability measure, between 0 and 1, inclusively, that the rule assigns to the said conclusion;

creating an augmented corpus of m training entries, where each entry i in said augmented corpus is created from data portion of entry i in said initial corpus of training entries, i=1,2, . . . m, with each label l of said k labels forming an attachment to said entry i weight ηp($x_i$,l) when conditions of said rule for label l are met, and a weight $1-\eta p(x_i,l)$ where said conditions of said rule for label l are not met; or forming a non-attachment to said entry i weight $1-\eta p(x_i,l)$ when conditions of said rule for label l are met, and a weight $\eta p(x_i,l)$ where said conditions of said rule for label l are not met; and combining said augmented corpus of m training entries with said initial corpus of training m entries to form said enlarged corpus having 2m training entries.

2. The method of claim 1 where said rule is created based on prior knowledge of said particular application.

3. The method of claim 1 where said one or more conditions constitute a logical association of data elements that are expected in entries to a classifier constructed through interaction with said enlarged corpus of training entries.

4. The method of claim 3 where said particular application involves recognizing spoken speech, and said data elements are words.

5. The method of claim 1 where the conjunctive or is inclusive, thus forming two corpa that augment said initial corpus via said step of combining.

6. The method of claim 1 where each entry x in said initial training corpus includes, in addition to said data portion, an indication of which of said k labels are attached to said entry x.

7. The method of claim 1 further comprising a step of attaching any number of said k labels to each of said m entries of said initial training corpus.

8. The method of claim 1 further comprising the step of creating a classifier from said enlarged corpus of training sequences.

* * * * *